Feb. 10, 1931.  A. C. DANNER  1,791,614
AUTOMATIC STARTER SWITCH MECHANISM
Filed Dec. 28, 1929  2 Sheets-Sheet 2
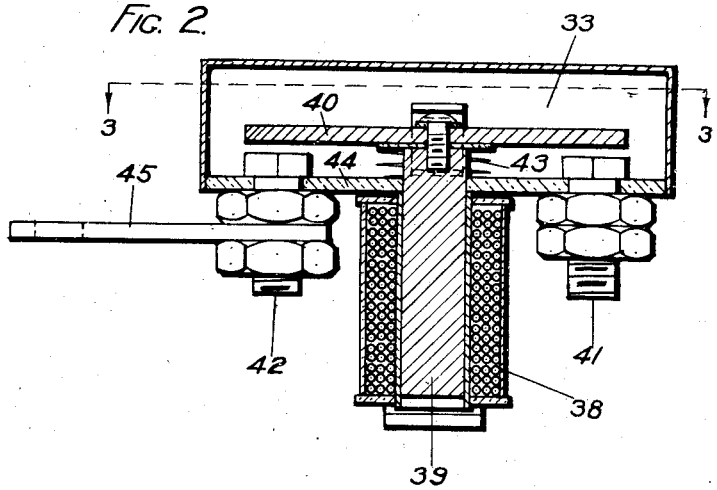
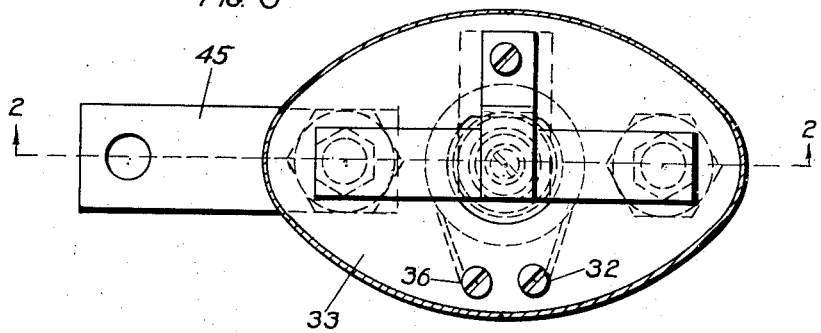
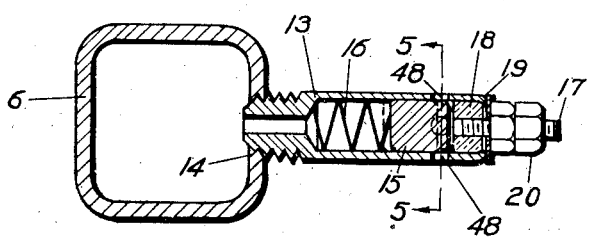 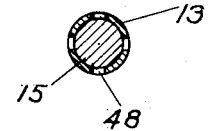
Inventor
ALBERT C. DANNER
By Owen H. Spencer
Attorney Patented Feb. 10, 1931

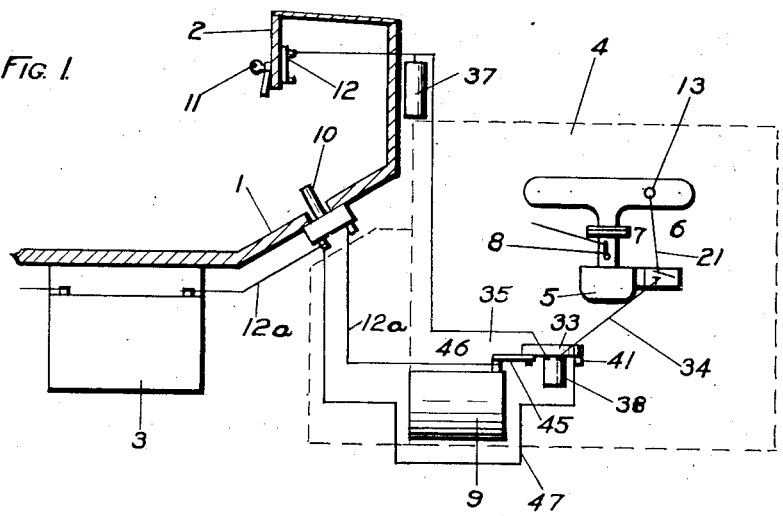
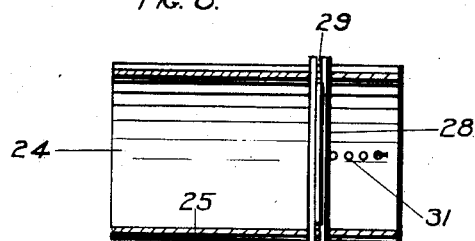
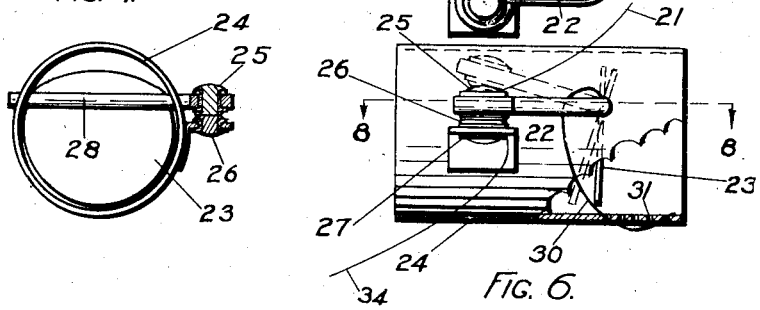

1,791,614

UNITED STATES PATENT OFFICE

ALBERT C. DANNER, OF INDIANAPOLIS, INDIANA, ASSIGNOR OF ONE-HALF TO WESLEY RYAN AND ONE-HALF TO ROLLIN H. STEWART, BOTH OF INDIANAPOLIS, INDIANA

AUTOMATIC STARTER-SWITCH MECHANISM

Application filed December 28, 1929. Serial No. 417,221.

This invention relates to automatic starter switch mechanisms, designed primarily for use in connection with internal combustion engines and which, in this instance, is shown and described in connection with an autamobile engine and its cooperating parts.

One feature of the invention is the provision of means for constantly maintaining an electric circuit between the engine starter and the battery, so long as the ignition switch is closed and the engine is idle.

A further feature of the invention is the provision of automatically operated means for breaking the circuit to the starter the instant the engine starts to function.

A further feature of the invention is the provision of means for maintaining a break in the circuit in the event the vacuum within the engine is reduced incident to sudden increased acceleration of the engine.

Other objects and advantages will be hereinafter more fully set forth and pointed out in the accompanying specification.

In the accompanying drawing which is made a part of this application,

Figure 1 is a diagrammatic view of the engine and dash of an automobile with the starter switch mechanism attached thereto.

Figure 2 is a vertical longitudinal sectional view through a magnet as seen along the line 2—2, Fig. 3.

Figure 3 is a transverse sectional view as seen along line 3—3, Fig. 2.

Figure 4 is a sectional view through a manifold and a valve structure associated therewith.

Figure 5 is a transverse sectional view through the valve as seen along line 5—5, Fig. 4.

Figure 6 is a side elevation of a valve structure adapted to be attached to a carbureter, parts being broken out.

Figure 7 is an end elevation thereof.

Figure 8 is a section thereof as seen along line 8—8, Fig. 6.

Referring to the drawings in which similar reference numerals designate corresponding parts throughout the several views, the numeral 1 indicates parts of the body of a vehicle, having an instrument board 2 and a battery 3 mounted thereon, an engine 4 being shown in dotted lines forwardly of the body of the vehicle, said engine being preferably of the internal combustion type.

Associated with the engine 4 is the conventional form of carbureter 5, connecting with the conventional form of manifold 6, the carbureter having the conventional form of air inlet 7 and a valve operating lever 8. Also associated with the engine 4 is the conventional form of starter 9, having a conventional form of starter switch 10 arranged to be operated by pressure from the foot or otherwise. With the structure so far described, when starting the engine, a key 11 is inserted in the ignition switch 12 and turned to close said switch, when by applying pressure to the starter switch 10, a circuit 12A is closed between the battery 3 and starter 9, for energizing the starter and rotating the engine. This requires strict attention of the operator and considerable time, with disastrous results, in the event the foot is not removed from the starter switch 10, as soon as the engine turns over.

To overcome this objectionable feature and provide means for shunting around the starter switch 10 and instantly energizing the starter, so long as the ignition switch 12 is closed, and the engine is stopped, a vacuum cutout 13 is attached to the manifold 6, said cutout comprising a tubular sleeve, which is threaded into a bore 14 in the manifold. Slidably mounted in the tubular sleeve is a contact plunger 15, normally held in its outward contacting position by means of a spring 16, a fixed contact 17 being entered in the outer end of the tubular sleeve of the cutout 13 and extended through suitable fiber or other suitable insulating material 18, the outer end of the sleeve being swaged inwardly to form a flange 19, which prevents the insulation 18 from leaving the end of the cutout 13. The outer end of the contact 17 has binding nuts 20 threaded thereon for attaching the terminal of a circuit forming wire 21 to the contact 17, the opposite end of said wire connecting with the controlling arm 22, of an air operated butterfly valve 23, said valve being mounted in a housing 24. The wire 21 connects with a contact point 25, carried by the arm 22 and said contact cooperates with a similar contact 26, carried by a bracket 27, mounted on the side of the housing 24. The valve 23 is circular at its lower portion and substantially oval at its upper portion, so that the major portion of the valve 23 will lie in close proximity to the wall of the housing 24 so as to catch a large volume of air on the surface thereof below the pivot shank 28 for the valve, while the upper portion of the valve will set up practically no resistance to the swinging of the valve.

The shank 28 is preferably slotted, said slot 28 receiving the valve 23 and the valve is permanently anchored in the slot in any suitable manner, as by applying solder thereto.

The housing 24 has a sliding fit over the end of the air inlet 7 of the carbureter, so that as air is drawn into the carbureter, the force of the air against the lower portion of the valve 23, will swing the arm 22 upwardly and break the circuit between the contact points 25 and 26. In order to immediately lower the arm 22 and again form contact between the points 25 and 26, incident to the stop pace of the engine, a spring 30 is provided, one end of the spring extending through the slot 29 and then bending downwardly in curved formation, with the extreme lower end thereof anchoring in one of a number of openings 31, formed through the wall of the housing 24. By providing a number of the openings 31, the anchoring point for the lower end of the spring 30, may be changed for increasing or decreasing the spring tension of the spring.

Extending from the contact point 26 to one pole 32 of a magnet 33, is a wire 34, while a wire 35 is extended from the other pole 36 of the magnet to the ignition switch 12, said wire intersecting an ignition coil 37.

The magnet 33 comprises a solenoid 38, the plunger 39 of which has a cross bar 40, the ends of which cooperate with contact posts 41 and 42, when the solenoid is energized, for conveying an electric current from one post to the other and completing a circuit therethrough. As soon as the solenoid 38 is deenergized, the cross bar 40 is moved out of contact with the posts 41 and 42 by means of a spring 43, located between the fiber base 44 of the magnet and the cross bar 40.

The magnet 33 is preferably suspended from parts of the starter 9 by means of an insulated arm 45, one end of which embraces the post 42 and the opposite end thereof, a terminal 46 of the starter.

The post 41 of the magnet 33 is in circuit with the battery 3, through the medium of the circuit forming wire 47, said wire connecting with the circuit 12A through the starter switch 10, another line of the circuit 12A extending from the other pole of the starter switch to the terminal 46 of the starter.

To prevent a vacuum at the outer end of the plunger 15, which would retard the free action of the plunger, any suitable form of opening is formed through the wall of the member 13, adjacent the point of engagement between the members 15 and 17, in this instance a plurality of bores 48, so that air may enter the member 13 in the rear of the plunger 15, as it starts on its inward stroke, thus eliminating any vacuum forming at this point.

When the engine is not running, there is no vacuum in the manifold and there is no air passing through the carbureter, consequently the plunger 15 is in engagement with the contact 17, while the contacts 25 and 26 are in engagement with each other, thereby completing a circuit from the cutout 13 through the starter 9 and battery 3, to the ignition switch 12, so that immediately upon closing said ignition switch, the starter 9 will be energized and the engine turned over.

The instant the engine starts to function, the vacuum created by the operation of the pistons of the engine will pull the plunger inwardly and break the circuit to the starter, thereby instantly cutting out the starter. Likewise, the instant the vacuum is created in the engine, air will be drawn through the carbureter, thus raising the contact 25 out of engagement with the contact 26 and further breaking the circuit to the starter. Under normal running conditions, the vacuum and air will maintain the contacts 15 and 25 in open position, but in the event the vacuum is lowered, incident to the acceleration of the motor or the engine is idling, to such an extent that the plunger 15 will close, the contact 25 will still be held open by the air entering the carbureter, so that the circuit to the starter will still remain broken, so long as the engine continues to operate.

When the engine is standing idle, it is but necessary to close the ignition switch 12 to start the engine, the closing of said switch energizing the magnet 33, which will lower the cross bar 40 into engagement with the posts 41 and 42 and close the circuit from the battery 3 to the starter 9. The instant the engine starts to function, however, the plunger 15 and the contact 25 will be moved out of contact with their respective cooperating parts and break the circuit to the starter and cut out the operation thereof. If at any time the engine should stop while the switch 12 is closed, the starter 9 will be substantially instantly energized and automatically set in operation for again starting the engine and this is accomplished without requiring any attention from the driver of the car, thus obviating the possibility of the engine remaining dead, should it stop on a railway crossing or other dangerous place.

What I claim is:

1. In an automatic starter switch mechanism, the combination with an engine, a carbureter associated therewith, and an electrically operated starter for said engine, of a circuit breaking mechanism operated by the vacuum in said engine for breaking a starter circuit, and an additional circuit breaking mechanism operated by the suction of air into said carbureter for forming an additional break in the starter circuit.

2. In a starter switch mechanism, the combination with an engine, a starter therefor, an electric circuit connected with said starter, and a carbureter connected with said engine, of a circuit making and breaking mechanism in said circuit adapted to break said circuit when a vacuum exists in said engine, and an additional circuit making and breaking mechanism influenced by said carbureter for maintaining the break in said circuit when the vacuum fails in said engine while the engine is still running.

In testimony whereof, I have hereunto set my hand on this the 27th day of December, 1929.

ALBERT C. DANNER.